US012766070B2

(12) United States Patent
Kalz

(10) Patent No.: US 12,766,070 B2
(45) Date of Patent: Oct. 20, 2026

(54) PARTNER TOY FOR MASSAGING A FIRST AND A SECOND PERSON

(71) Applicant: FUN FACTORY GmbH, Bremen (DE)

(72) Inventor: Simone Kalz, Bremen (DE)

(73) Assignee: FUN FACTORY GMBH, Bremen (DE)

( * ) Notice: Subject to any disclaimer, the term of this patent is extended or adjusted under 35 U.S.C. 154(b) by 1106 days.

(21) Appl. No.: 17/743,304

(22) Filed: May 12, 2022

(65) Prior Publication Data

US 2023/0285224 A1 Sep. 14, 2023

(30) Foreign Application Priority Data

Mar. 9, 2022 (DE) ......................... 202022101288.1

(51) Int. Cl.
*A61H 19/00* (2006.01)
*A61H 23/00* (2006.01)

(52) U.S. Cl.
CPC ............. *A61H 19/44* (2013.01); *A61H 19/34* (2013.01); *A61H 19/50* (2013.01); *A61H 23/00* (2013.01); *A61H 2201/0207* (2013.01); *A61H 2201/5035* (2013.01)

(58) Field of Classification Search
CPC ...................................................... A61H 19/40
See application file for complete search history.

(56) References Cited

U.S. PATENT DOCUMENTS 5,690,603 A † 11/1997 Kain
9,295,572 B2 † 3/2016 Stout
11,123,259 B2 † 9/2021 Baetica
2009/0105818 A1 * 4/2009 George .................... A61F 5/41 600/38
2009/0281373 A1 * 11/2009 Mark .................... A61H 19/50 600/38
2014/0228628 A1 * 8/2014 De Alva ................ A61H 19/44 600/38
2016/0136037 A1 * 5/2016 Cai ........................ A61H 19/44 601/46
2018/0185237 A1 * 7/2018 Baetica .................. G08C 17/02
2023/0310262 A1 * 10/2023 Crozier .................. A61H 19/50 600/38

FOREIGN PATENT DOCUMENTS

EP 1 824 440 B1 3/2016
EP 2 726 048 B1 11/2016
GB 2590697 A * 7/2021 ............. A61H 19/44
WO WO-2018164631 A1 * 9/2018 ............. A61H 19/44

* cited by examiner
† cited by third party

*Primary Examiner* — Thaddeus B Cox
(74) *Attorney, Agent, or Firm* — Seed Intellectual Property Law Group LLP

(57) ABSTRACT

A partner toy for massaging a first and a second person includes a curved shaped body having a first leg for introducing into a bodily orifice of the first person, a second leg for introducing into a bodily orifice of the second person, and a transition segment between the first and the second leg, at least the second leg being substantially cylindrical in design. The partner toy further includes an internal clip for aligning the first and the second leg to each other, the clip being made at least partially of a reversibly plastically deformable thermoplastic polymer material.

17 Claims, 4 Drawing Sheets

PARTNER TOY FOR MASSAGING A FIRST AND A SECOND PERSON

BACKGROUND

Technical Field

The disclosure relates to a partner toy for massaging a first and a second person.

Description of the Related Art

Various types of partner toys are known from the prior art. For example, strap-on dildos are known for attaching around the waist of an active partner, preferably a woman, in order to penetrate a passive partner vaginally or anally by means of a dildo. The belt or strap provided for buckling on comprises an opening through which any arbitrary dildo can be passed. It is also possible, however, that the dildo is already permanently connected to the belt or strap. A disadvantage of strap-on dildos is that parallel massaging of two persons is not possible, but rather only the passive partner is massaged.

Therefore, partner toys in the form of a double dildo are further known from the prior art. Such double dildos are also already known from the applicant. Double dildos comprise a first dildo, preferably for introducing vaginally, a second dildo for vaginally or anally penetrating the passive partner, and a connecting segment between the first and the second dildo. Double dildos therefore enable stimulation of both the active partner and the passive partner. Because, however, the first dildo is retained in the vagina exclusively by means of the musculature of the pelvic floor, it is occasionally possible that the double dildo shifts during penetration.

Partner toys are further known from the prior art for being worn by a woman during sexual intercourse. EP 1 824 440 B1 relates to a sexual stimulation device comprising an internal arm for introducing into the vagina of a woman, an external arm for placing on the clitoral region of the woman when the internal arm is vaginally inserted, and an elastic, U-shaped element connecting the internal and external arms with each other and being narrow and thin in design for enabling sexual intercourse. The U-shaped element brings about a clamping force ensuring that the internal arm presses against the ventral surface of the vagina and the external arm presses against the clitoral region.

EP 2 726 048 B1 relates to a device having an internal arm for introducing vaginally, an external arm for placing on the clitoral region of the woman, and a middle part connecting the internal arm to the external arm. It is further disclosed that the internal arm comprises a pair of opposing wing parts for bringing into contact with the front wall of the vagina and spaced apart from each side of a center part of the internal arm. Said device is also suitable for being worn by a woman during sexual intercourse.

The devices described above each comprise a first arm, a second arm, and a connecting segment. Each disclosed connecting segment is implemented sufficiently thin so that the entrance to the vagina is not already completely covered by the device, and so that it is possible to simultaneously insert a further object or part of the body into the vagina. The two arms are provided for massaging the woman during sexual intercourse and thus do not have the function and do not provide the ability to be inserted into bodily orifices of different persons.

BRIEF SUMMARY

The object of the disclosure is to provide a device for simultaneously massaging a first and a second person having improved comfort when worn, wherein shifting of the same is preferably largely prevented.

For a partner toy of the type indicated above, the object is achieved by a curved shaped body having a first leg for introducing into a bodily orifice of the first person, a second leg for introducing into a bodily orifice of the second person, and a transition segment between the first and the second leg, at least the second leg being substantially cylindrical in design, the partner toy comprising an internal clip for aligning the first and the second leg to each other, wherein the clip is made at least partially of a reversibly plastically deformable thermoplastic polymer material.

The first leg is preferably inserted vaginally into the first person, but can also be received anally or orally by the first person. The first person is therefore the active partner and can penetrate the second person, being the passive partner, vaginally, anally, or orally by means of the second leg. It is further preferable that the second leg is used for rubbing a clitoral region of the second person, or, when the partner toy is used by the first person alone, for placing on the clitoral region of the first person.

The internal clip is reversibly plastically deformable, that is, the first leg and the second leg can be aligned arbitrarily by means of the clip by a user by means of applying force and remain in the desired alignment. The orientation of the first leg and the second leg can thereby be adjusted to different angular positions between the bodily orifice of the first person and the bodily orifice of the second person, whereby massaging of different bodily orifices is made possible. The partner toy remains in the desired shape during penetration, so that a secure grip in the bodily orifice of the first person and good ability to control the second leg are ensured.

In an initial shape, the body of the partner toy is curved shaped in design. It can be considered in some respects, a modified U-shape in the resting position. Since the two legs of the U-shape are different lengths, it could be considered as modified U-shape or a substantially U-shape. The shape of the body can alternatively be described as parabolic, wherein the vertex of the parabolic body is in the transition segment between the first and the second leg. By deforming the clip, the parabolic body can be extended or compressed. A total mass of the particularly preferred is preferably in a range from 300 grams to 400 grams, preferably in a range from 330 grams to 370 grams, particularly preferably in a range from 340 to 360 grams.

It is preferable that the body is formed substantially of an elastic material. The elastic material is preferably a rubber material, a thermoplastic elastomer material or silicone material, particularly preferably having a Shore hardness in a range from 10 to 20, preferably 13 to 17. Silicone material is particularly pleasant on the skin, particularly when a medical silicone is used as the silicone material. The internal clip is preferably entirely enclosed by the elastic material. As a result, the internal clip is protected against direct contact with the bodies of the first person and of the second person, and the first and the second person cannot be directly injured by the internal clip.

In a preferred refinement, the first leg comprises a back side and a ventral side. The back side is part of an outer contour of the curved shaped body and the ventral side is part of the inner contour of the curvedshaped body. When the first leg is vaginally inserted, the back side preferably contacts a dorsal wall of the vagina and the ventral side contacts a ventral wall of the vagina. The back side is preferably continuously curved, preferably without any inflection points in a section view. The ventral side preferably comprises a first curve segment and a second curve segment, wherein the first and second curve segment are separated from each other by a notch. The back side is preferably convexly curved in design. The first curve segment is preferably convexly curved in design. The second curve segment is preferably convexly curved in design. The notch is preferably formed by a concave curvature. The ventral side accordingly preferably comprises a convex-concave-convex curved shape. A central axis of the first leg, extending centrally through the first leg, is also preferably curved in design. The central axis of the first leg preferably runs parallel to the back side of the first leg.

The back side and the first curve segment preferably form a first massage segment and the back side and the second curve segments form a second massage segment of the first leg. The first massage segment is preferably bulbous in design. It is further preferable that the first massage segment is completely formed of the elastic material of the body. When the first leg is inserted vaginally, the first massage segment preferably serves for massaging the G-spot. The second massage segment is preferably adapted to the inner contour of the vagina and preferably completely contacts the inner wall of the vagina. It therefore serves for massaging the inner wall of the vagina and for retaining the first leg in position. The entire shape of the first leg is preferably adapted to the anatomical conditions of the vagina. The comfort of the first leg in the vagina of the first person is further improved.

In a preferred refinement, the second leg comprises an end face proximal to the transition segment. The end face is preferably convex in design. It is further preferable that the end face is disposed opposite the second curved segments of the first leg in an initial shape of the U-shaped body. When the first leg is inserted vaginally into the first person, the end face of the second leg preferably contacts the clitoral region of the first person. The force applied by the first person for penetrating the second person thereby preferably acts completely perpendicularly on the end face of the second leg. An optimal force transfer is therefore enabled.

The second leg is, as described above, substantially cylindrical in design. In a preferred refinement, the second leg is phallus-shaped in design. It is further preferable that the second leg comprises a radial expansion at an end proximal to the transition segment. The radial expansion is preferably not enclosed by any bodily orifice when the first leg is inserted in a bodily orifice of a first person and the second leg is inserted in a bodily opening of a second person. The radial expansion can form or comprise the end face. A central axis of the second leg, extending centrally through the second leg, is preferably curved in design. The shape of the second leg is implemented overall such that the second leg gently both adapts to the anatomical conditions of a vagina and adapts to the anatomical conditions of a rectum. As a result, a pleasant massage is achieved by means of the second leg.

It is preferable that the internal clip comprises a first end segment and a second end segment. The first end segment is preferably disposed in the first leg and the second end segment is disposed in the region of the radial expansion of the second leg. It is particularly preferable that the first end segment of the clip is disposed adjacent to the notch of the first leg, and it is further particularly preferable that the second end segment is disposed substantially parallel to the end face of the second leg. A mass of the internal clip is preferably in a range from 10 grams to 22 grams, particularly preferably in a range from 14 grams to 20 grams.

In a preferred refinement, the first end segments and the second end segment of the internal clip comprises a protrusion. The protrusion is preferably cuboid in design and preferably extends on a single side of the internal clip. It is, however, also preferable that a cuboid protrusion extends on both sides of the internal clip. A base side of the cuboid protrusion is preferably adapted to the geometry of a lateral surface of the internal clip. It is further preferable that the internal clip is anchored in the body by means of the end segments. This prevents shifting of the inner clip in the body.

In a preferred embodiment, the internal clip comprises a rectangular cross section at least in the region of the transition segment. The rectangular cross section preferably comprises a first and a second side. A first side length of the first side preferably lies in a range from 1 mm to 25 mm, further preferably in a range from 2 mm to 20 mm, particularly preferably in a range from 2 mm to 12 mm. A second side length of the second side preferably lies in a range from 1 mm to 25 mm, further preferably in a range from 2 mm to 20 mm, particularly preferably in a range from 2 mm to 12 mm. The first side and the second side preferably have the same side length, so that the cross section of the clip is square and therefore symmetrical in design. It is further preferable that the internal clip comprises a rectangular cross section not only in the region of the transition segment, but the entire clip also comprises a rectangular cross section. In addition, round, triangular, and other symmetrical and asymmetrical cross sections of the internal clip are preferable.

The transition segment is preferably formed integrally with the first leg and the second leg. The first leg, transition segment, and second leg thus flow into each other without transition seams. As a result, no sharp edges presenting an increased hazard of being injured are formed between the first leg, the transition segment, and the second leg.

In a preferred refinement, the transition segment comprises a substantially circular cross section. It is further preferable that the transition segment comprises an oval cross section. A round or oval cross section ensures stability of the transition segment, so that the transition segment does not buckle during penetration.

The transition segment preferably comprises a maximum diameter in a range from 10 mm to 40 mm, particularly preferably in a range from 15 mm to 30 mm. Inserting a further object or body part into the bodily orifice of the first person is thus prevented. It is therefore not provided that the transition segment is narrow and thin in design for enabling simultaneously sexual intercourse.

In a preferred embodiment, the first leg has a first length and the second leg has a second length. The first length of the first leg preferably extends along the curved central axis of the first leg from an end of the first leg proximal to the transition segment to a an end of the first leg distal to the transition segment. The second length of the second leg preferably extends along the curved central axis of the second leg from the end face proximal to the transition segment to an end of the second leg distal to the transition segment. A length ratio between the first length of the first leg and the second length of the second leg lies in a range from 1:1.2 through 1:4, particularly preferably in a range from 1:2 to 1:3. Said length ratio enables good controllability of the second leg.

With respect to the internal clip, it is preferable that said clip is formed of a thermoplastic polymer material having a low softening temperature range. A low softening temperature range in this sense means a softening temperature range lying significantly below the softening temperature range of the elastic material of the body, wherein the preferable silicone material generally has a softening temperature range from 200 to 250° C. A user can thus, in case of damage to the internal clip of the partner toy, heat up the partner toy to a temperature range above or close to or in the range of the softening temperature range of the internal clip, but below the softening temperature range of the elastic material of the body, and transform the internal clip into the initial shape or another desired shape.

According to a preferred embodiment, the internal clip is formed of a thermoplastic polyester material. Said material is a particularly simple material for the internal clip. The material of the internal clip preferably comprises a softening temperature range from 50° C. to 80° C., particularly in a range from 55° C. to 65° C. It is thus possible that the partner toy can be heated by means of a microwave oven or by heating and pouring water over or placing the partner toy in the hot water.

According to a particularly preferred embodiment, the internal clip is formed of polymorph. Polymorph refers to a material comprising a thermoplastic polyester material having a softening temperature range from approximately 55° C. to 65° C.

In a preferred embodiment, the partner toy comprises a foam core. The foam core is preferably disposed in the second leg and is entirely enclosed by the elastic material of the body. As a result, the foam core is protected against direct contact with the bodies of the first person and the second person. The foam core reinforces the second leg and increases the stability of the second leg. It is preferable that the foam core is substantially cylindrical in design and is substantially perpendicular on the curved end face. The second end segment of the internal clip is preferably disposed between the end face and the foam core, wherein the foam core and the internal clip are not connected to each other. The force applied by the first person for penetrating the second person, preferably acting entirely perpendicularly on the end face of the second leg, can thus be optimally transmitted to the foam core and acts parallel or coaxial to a central axis of the foam core. The second leg is further easily controlled by the second leg.

With respect to the foam core, it is preferable that said core is formed of a material simultaneously comprising high shape stability and low density, so that the foam core is dimensionally stable and simultaneously lightweight in design. The second leg, in which the foam core is disposed, therefore also retains the shape and alignment thereof during penetration. A foam core can also be molded, being lightweight and simultaneously sufficiently large for preferably substantially reinforcing the entire second leg. It is particularly preferable that the material of the foam core has a lower density than the thermoplastic polymer material of the internal clip. The mass of the foam core preferably lies in a range from 5 grams to 20 grams. It is further preferable that a ratio of the mass of the internal clip to the mass of the foam core lies in a range from 2.5:1 to 1.5:1. The weight distribution between the first leg and the second leg is thereby optimized and the second leg is more controllable. A center of gravity of the entire partner toy preferably lies in the range of the radial expansion of the second leg.

It is further preferable that the foam core is slightly pliable in design, so that the foam core can adapt to anatomical conditions during penetration. It is therefore particularly preferable that the foam core is formed at least partially of a polyurethane material and/or polyethylene material. A foam core made of polyethylene material can simultaneously have high shape stability, relatively low density, and sufficient pliability. An autoignition temperature of the polyethylene material preferably lies in a range above 250° C., preferably above 300° C. The autoignition temperature of a foam core made of polyethylene material is thus significantly greater than the softening temperature range of the internal clip. As a result, when heating the partner toy to a temperature range above or near or in the range of the softening temperature range of the internal clip, but below the softening temperature range of the elastic material of the body, there is no danger that the foam core will auto ignite. It is further preferable that the polyethylene material has a softening temperature range from 100° C. to 150° C., preferably at least 100° C. It is therefore particularly preferable when a user, in case of damage to the internal clip of the partner toy, heats the partner toy to a temperature range above or near or in the range of the softening temperature range of the internal clip, but below the softening temperature range of the polyethylene material of the foam core. The polyethylene material preferably has a relative density in a range from 0.02 to 0.3.

In a preferred refinement of the first embodiment, the foam core emulates the shape of the second leg. The foam core is phallus-shaped in design and comprises a radial expansion at an end proximal to the transition segment. A central axis of the foam core is preferably curved in design and preferably runs coaxial to the central axis of the second leg. The foam core thus reinforces substantially the entire second leg.

In a further preferred embodiment, the partner toy comprises a drive, a drive support for receiving the drive, an energy source for supplying the drive with electrical energy, and an electronic control unit for actuating the drive. The drive is preferably disposed in the second leg of the partner toy and preferably generates mechanical vibrations in the second leg. The bodily orifice of the second person into which the second leg is inserted is thus additionally massaged by means of mechanical vibrations. The drive is preferably a vibration drive and generates a vibration in the second leg. A particularly pleasant massage of the second person is thereby achieved. The drive support for receiving the drive, the energy source for supplying the drive with electrical energy, and the electronic control unit for actuating the drive are also preferably disposed in the second leg of the partner toy.

In a preferred refinement of the second embodiment, the drive is rigidly connected to the internal clip. To this end, the partner toy preferably comprises a connecting element having a first connecting segment and a second connecting segment. The internal clip preferably comprises a protrusion at the second end segment thereof connected to the first connecting segment of the connecting element. The connecting element is connected to the drive support in which the drive is received by means of the second connecting segment.

The control unit preferably comprises a storage unit having a plurality of pre-stored vibration profiles able to be used for actuating the drive. The pre-stored vibration profiles thereby comprise different mechanical vibration combinations of variable vibration amplitudes and/or variable frequencies. Different vibrations can therefore be generated in the second leg. In an embodiment, the storage unit is one or more memories, including but not limited to random access memory, read-only memory, and flash memory configured to store computer readable instructions corresponding to different vibration profiles that are executed by the control unit and in particular, at least one processor of the control unit.

The partner toy further comprises at least one control element coupled to the control unit and suitable for switching on and off the drive and/or for selecting a vibration profile from the plurality of pre-stored vibration profiles. It is preferable that the control element comprises at least one first control knob for switching the drive on and off. It is further preferable that the control element comprises a second control knob for selecting a vibration profile from the plurality of pre-stored vibration profiles. The user can thus select whether additional stimulation by the drive is desired, and can select from the plurality of pre-stored vibration profiles.

The control element is preferably disposed in a recess at the outer contour of the curved shaped body. The control element is particularly preferably disposed in a region not intended for being inserted into the bodily orifice of the first person nor into the bodily orifice of the second person. The control element further preferably comprises a cover by means of which the control element is attached to the body. The recess is preferably implemented as a negative shape of the control element including the cover, so that the control element, when disposed in the recess, does not protrude but rather forms a continuous contour with the body. It is preferable that only the first and/or the second control knob form a haptic protrusion. Operating without seeing the control knobs is possible.

In a preferred refinement, the drive is substantially cylindrical in design and comprises a longitudinal axis. The longitudinal axis of the drive is preferably disposed parallel to a longitudinal axis of the second leg, wherein the second leg is also substantially cylindrical in design. It is particularly preferable that the longitudinal axis of the drive is coaxial to the longitudinal axis of the second leg. A particularly uniform mechanical vibration is thereby achieved in the second leg and the massage is perceived as particularly pleasant.

A further subject-matter of the disclosure is a method for using the partner toy. A user of the partner toy first aligns the first and the second leg to each other. The user can thereby adjust the alignment of the first and the second leg at different angular positions between the bodily orifice of the first person and the bodily orifice of the second person. As a result, massaging different bodily orifices is possible. The partner toy also remains in the desired alignment because the internal clip by means of which the aligning of the legs is achieved is formed of a reversibly plastically deformable material.

The first leg is then inserted into a bodily orifice of the first person. The first leg is preferably inserted vaginally into the first person, but can also be inserted anally or orally into the first person. When the first leg has been vaginally inserted, said leg is retained in the vagina by the musculature of the pelvic floor. The second leg is then inserted into a bodily orifice of the second person. The second leg can also be inserted vaginally, anally, or orally for the second person. The first and the second leg are connected to each other by means of the transition segment, so that no belt or strap is necessary for retaining and guiding the second leg. If the alignment of the first and the second leg is not optimally adapted to the angular position of the two bodily orifices, the alignment can now be readjusted. It is further preferable that the first person now applies a force for penetrating the second person, wherein the force preferably acts perpendicular to the end face of the second leg.

In a further preferred step, the partner toy is heated to a softening temperature of the internal clip after the massage is completed for restoring an initial shape of the internal clip. The partner toy is preferably heated to a temperature range above or near or in the range of the softening temperature range of the internal clip, but below the softening temperature range of the elastic material of the body. The partner toy can be heated to said temperature range, for example, in a microwave oven or by heating and pouring water over or placing the partner toy in the hot water, wherein the temperature range is preferably in a range from 50° C. to 80° C., particularly in a range from 55° C. to 65° C. The internal clip can be transformed to the initial shape or any other desired shape in said temperature range.

Embodiments of the disclosure are described below using the drawings. Said drawings are not necessarily intended to depict the embodiments to scale; rather, the drawings are shown in schematic and/or slightly distorted form for explanatory purposes. With respect to supplements to the teachings directly discernable from the drawings, reference is made to the applicable prior art. It must thereby be considered that various modifications and changes relating to the shape and detail of an embodiment can be made without deviating from the general idea of the disclosure. The features of the disclosure disclosed in the description, in the drawings, and in the claims can be essential both individually and in any arbitrary combination for refining the disclosure. All combinations of two or more features disclosed in the description, the drawings, and/or the claims also fall within the scope of the disclosure. The general idea of the disclosure is not limited to the precise form or the detail of the preferred embodiments shown and described below or limited to a subject-matter that would be limited in comparison with the subject-matter claimed in the claims. Where dimensional ranges are indicated, values within the stated limits should also be disclosed as limit values and arbitrarily usable and claimable. For simplicity, identical reference numerals are used below for identical or similar parts or parts having identical or similar functions.

BRIEF DESCRIPTION OF THE SEVERAL VIEWS OF THE DRAWINGS

Further advantages, features, and details of the disclosure result from the below description of the preferred embodiments and from the drawings, which show.

DETAILED DESCRIPTION

Figure 1:
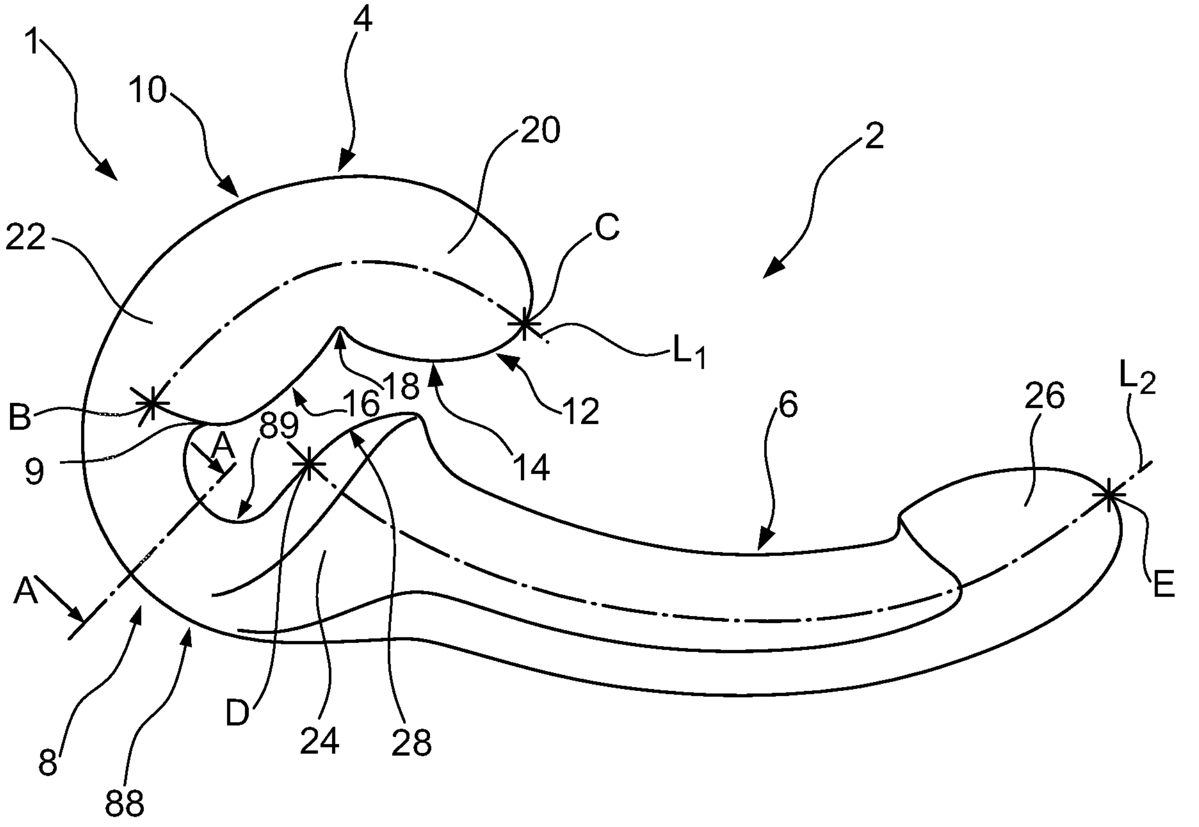
FIG. 1 is a schematic view of the partner toy according to a first embodiment example.

The partner toy 1 according to a first embodiment example (FIG. 1) is formed of an elastic material, particularly a silicone material. The partner toy 1 comprises a body 2 curved shaped in design, as a horizontal U in FIG. 1. The body 2 comprises a first leg 4, a second leg 6, and a transition segment 8 between the first and the second leg 4, 6.

The first leg 4 comprises a back side 10 and a ventral side 12 in the embodiment example shown, wherein the back side 10 is part of an outer contour 88 of the curved shaped body and the ventral side 12 is part of the inner contour 89 of the curved shaped body. When the first leg 4 is vaginally inserted, the back side 10 preferably contacts a dorsal wall of the vagina and the ventral side 12 contacts a ventral wall of the vagina (cf. FIG. 7). The back side 10 is continuously convexly curved in design. The ventral side 12 comprises a first, convex curve segments 14 and a second, convex curve segments 16, wherein the first curve segment 14 and the second curve segments 16 are separated by a notch 18 formed by a concave curvature.

Figure 7:
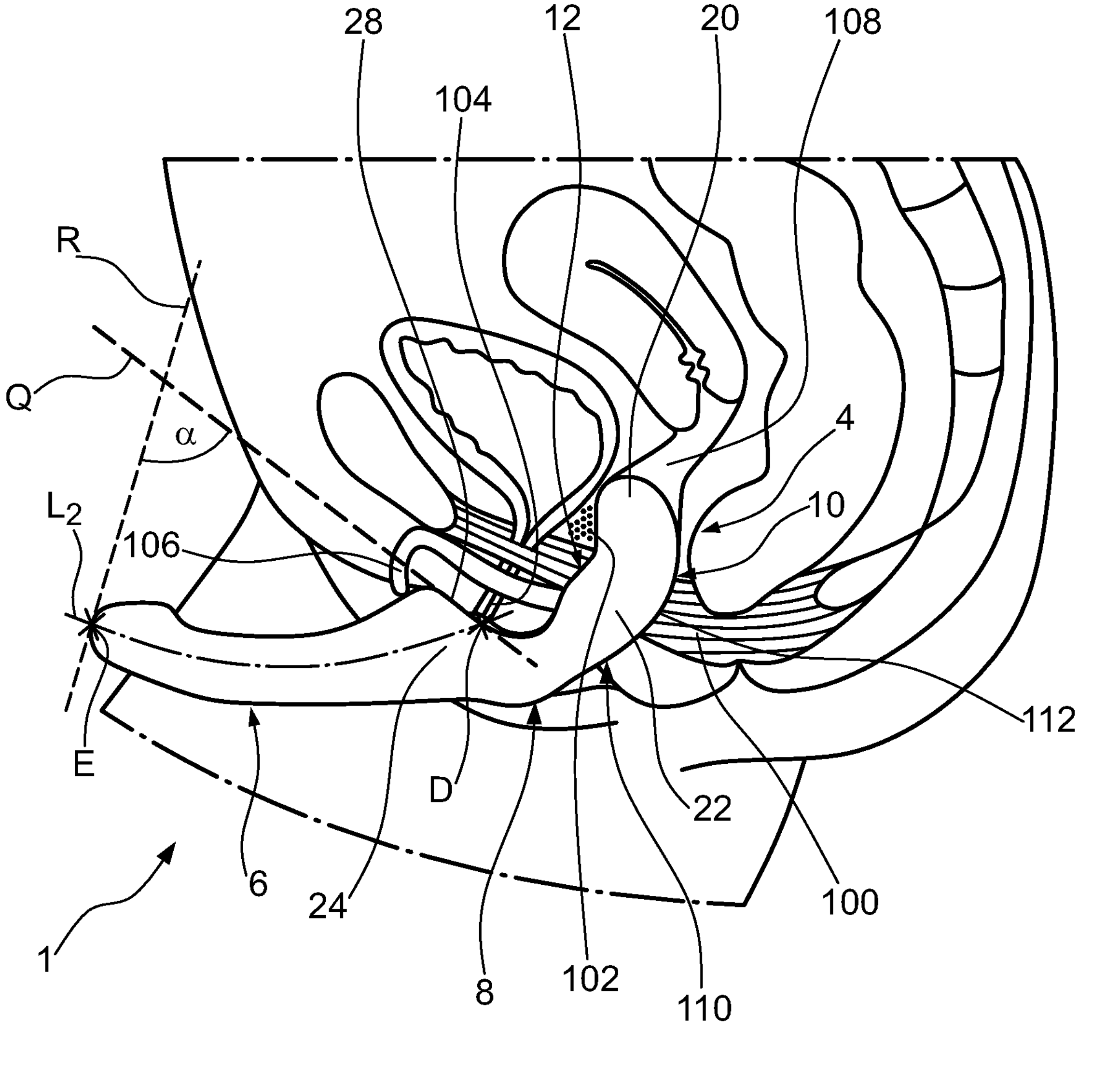
FIG. 7 is a schematic view of a vaginally inserted partner toy.

The back side 10 and the first curve segment 14 form a first massage segment 20, wherein the first massage segments 20 is substantially knobbed in design and is provided for massaging the G-spot 102 (cf. FIG. 7). The back side 10 and the second curve segment 16 further form a second massage segment 22, wherein the second massage segment 22 is substantially cylindrical in design. When the first leg 4 is vaginally inserted, the second massage segment 22 is positioned in the region of the entrance 110 of the vagina 108 and preferably fully contacts the inner wall 112 of the vagina 108 there (cf. FIG. 7). The second massage segment 22 is therefore provided for massaging the inner wall 112 of the vagina 108 and for retaining the first leg 4 in position (cf. FIG. 7).

A first central axis $L_1$ of the first leg 4, extending centrally through the first leg 4, is curved in design and runs substantially parallel to the curvature of the back side 10. The entire shape of the first leg 4 is thus adapted to the anatomical conditions of the vagina and thereby improves the comfort of the first leg 4 in the vagina. The shape of the first leg 4 could further be described as kidney-shaped.

The curvature of the back side 30 also transitions smoothly into the curvature of the transition segment 8 and in this respect forms a common curvature with the curvature of the transition segment 8. A concave curvature 9 is implemented between the ventral side 12 of the first leg 4 and the transition segment 8.

The transition segment 8 forms a constriction between the first leg 4 and the second leg 6. Said segment is sufficiently thick for preventing a further object or body part from being inserted into the bodily orifice of the first person. Said segment is further sufficiently strong in design that said segment does not buckle, even under increased force applied by the first person for penetrating the second person.

Figure 2:
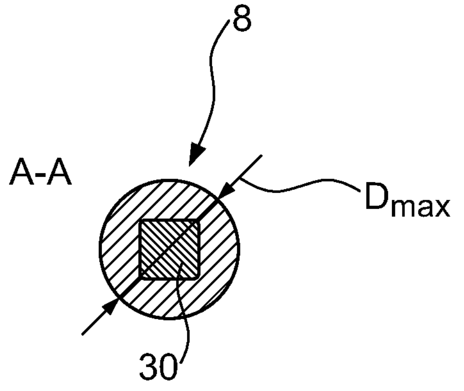
FIG. 2 is a cross-sectional view along the line A-A according to FIG. 1.
Figure 3:
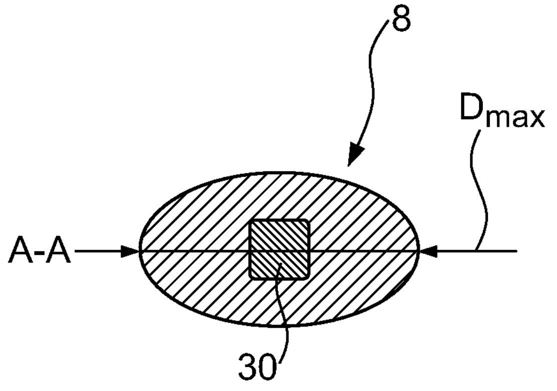
FIG. 3 is a cross-sectional along the line A-A according to FIG. 1 of a partner toy according to a further embodiment example.

According to a first design of the cross section along the line A-A in FIG. 1, the cross section of the transition segment 8 is circular in design (cf. FIG. 2). The maximum diameter $D_{max}$ of the circular cross section lies in a range from 10 mm to 40 mm, particularly preferably in a range from 15 mm to 30 mm. According to a second design of the cross section along the line A-A in FIG. 1, the cross section of the transition segment 8 is oval in design (cf. FIG. 3). The maximum diameter $D_{max}$ of said second design also lies in a range from 10 mm to 40 mm, particularly preferably in a range from 15 mm to 30 mm.

The second leg 6 according to the first embodiment example (FIG. 1) is phallus-shaped in design, wherein the second leg 6 comprises a radial expansion 24 at an end proximal to the transition segment 24. The second leg comprises a rounded cap segments 26 at an end distal to the transition segment 8. The region of the radial expansion 24 is not enclosed by any bodily orifice when the first leg is inserted in a bodily orifice of a first person and the second leg is inserted in a bodily opening of a second person.

The second leg 6 further comprises a curved end face 28. The curved end face 28 contacts the clitoral region of the first person, preferably between the entrance 110 of the vagina 108 and the clitoris 106, when the first leg is vaginally inserted (cf. FIG. 7). Due to the curved design, the end face 28 particularly pleasantly contacts the clitoral region of the first person. The force applied by the first person for penetrating the second person acts perpendicularly on the end face 28 and in the direction of the a second central axis $L_2$ of the second leg 6, wherein the second central axis $L_2$ is curved in design in the embodiment example shown according to FIG. 1.

In the embodiment example according to FIG. 1, the first leg 4 has a first length and the second leg 6 has a second length. The first length of the first leg extends along the curved first central axis $L_1$ of the first leg 4 from an end A proximal to the transition segment 8 to an end B distal to the transition segment 8 and preferably lies within a range from 5 cm to 12 cm, particularly preferably in a range between 7 cm and 12 cm. The second length of the second leg 6 extends along the curved second central axis $L_2$ of the second leg 6 from a point D to a point E of the second leg 6, wherein the point D is an intersection between the second central axis $L_2$ and the end face 28, and wherein point E is an intersection between the second central axis $L_2$ and an end of the second shaft 6 distal to the transition segment 8. The second length preferably lies in a range from 10 cm to 20 cm, particularly preferably in a range between 12 cm and 18 cm. A ratio between the first length of the first leg 4 and the second length of the second leg 6 preferably lies in a range from 1:1.2 through 1:4, particularly preferably in a range from 1:2 to 1:3. Said length ratio enables particularly good controllability of the second leg 6.

Figure 4:
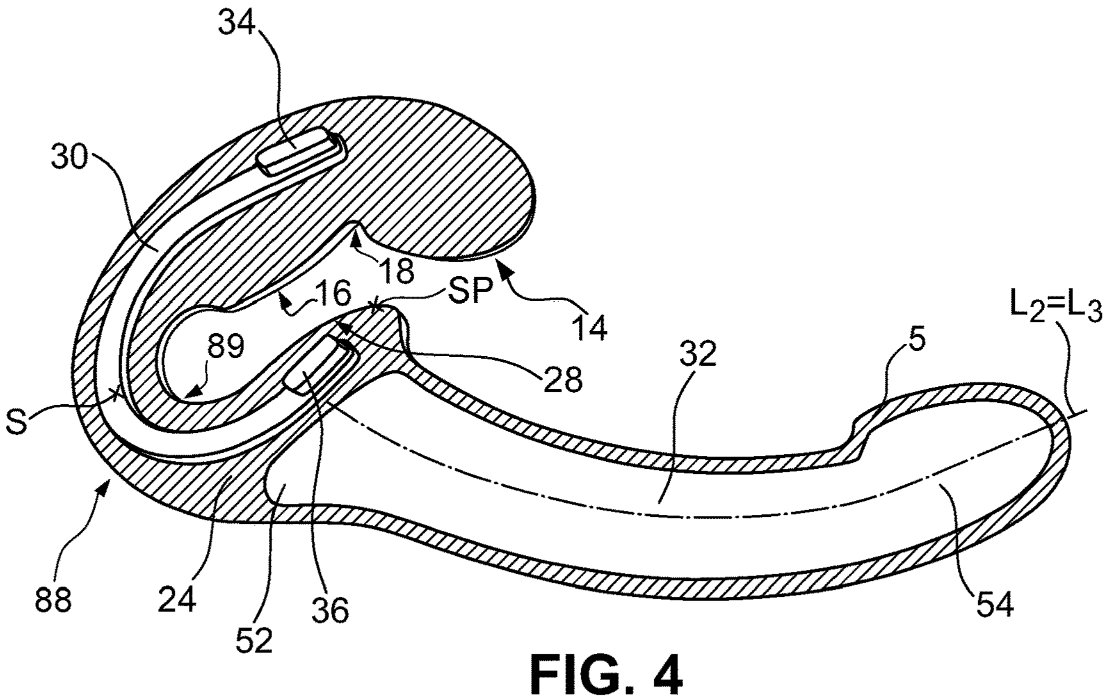
FIG. 4 is an internal view of the partner toy according to the first embodiment example.

FIG. 4 shows an internal view (partial section) of the partner toy 1 according to the first embodiment example. The internal view shows the internal clip 30 and the foam core 32 of the partner toy 1. The elastic material of the partner toy 1 enclosing the internal clip 30 and the foam core 32 preferably forms a casing 5 of the partner toy 1, wherein the casing 5 forms the outer contour 88 and the inner contour 89 of the partner toy 1. The mass of the casing 5 preferably lies in a range from 285 grams to 230 grams, particularly preferably in a range from 300 grams to 225 grams. A center of gravity SP of the entire partner toy preferably lies in the region of the radial expansion 24 of the second leg 6. In the embodiment example shown, the center of gravity SP is adjacent to the end face 28.

The internal clip 30 is formed of a thermoplastic polymer material having a low softening temperature range, particularly a polymorph, a thermoplastic polyester having a softening temperature range from 55° C.-65° C. The internal clip 30, like the body 2 of the partner toy 1, is curved shaped in design, or alternatively a modified or substantially U-shape, wherein a vertex S of the U-shaped portion, internal clip 30 is disposed in the transition segment 8. The internal clip 30 comprises a first end segment 34 and a second end segment 36. The toy is therefore flexible and the shape can be a modified U-shape when not being flexed and then can be bent to be in modified L-shape or alternatively, to be generally linear, with curves as shown in FIG. 7 when in use. The first end segment 34 is disposed in the first leg 4 adjacent to the notch 18. The second end segment 36 is disposed in the region of the radial expansion 24 of the second leg 6, wherein the second end segment 36 is disposed substantially parallel to the end face 28 of the second leg 6.

Figure 5:
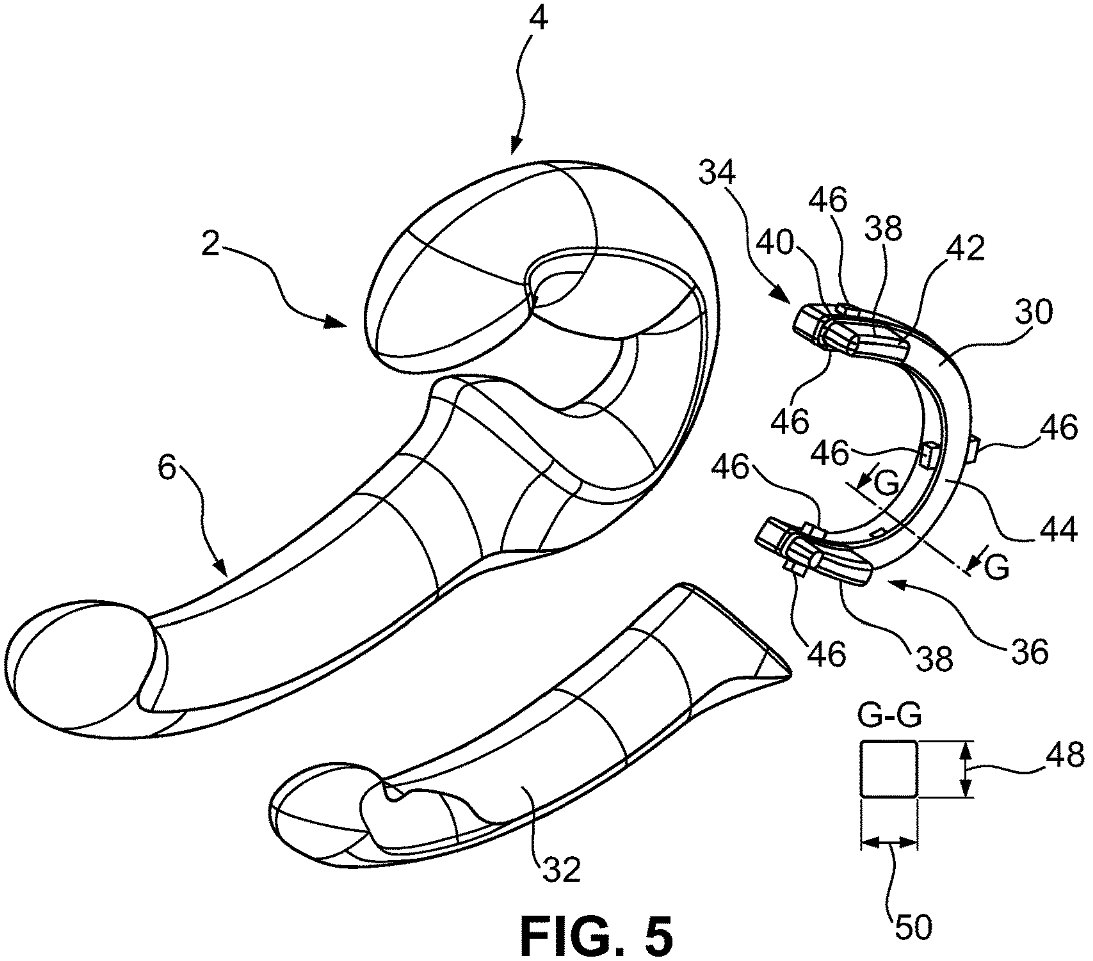
FIG. 5 is an exploded view according to the first embodiment example.

In the exploded view according to FIG. 5, it is evident that the first and second end segments 34, 36 each comprise a protrusion 38, cuboid in design, extending on one side of the internal clip 30. The protrusion 38 of the first end segment 34 extends on the same side as the protrusion 38 of the second end segment 36. The protrusion 38 comprises a chamfered bottom edge 30 and a chamfered top edge 42, wherein the chamfered bottom edge 40 expands in the direction of a lateral surface 44 of the internal clip 30 and conforms to the geometry of said lateral surface 44. The internal clip 30 is preferably anchored in the body 2 by means of the two end segments, so that shifting of the internal clip 30 is prevented. The internal clip 30 according to FIG. 5 further comprises small protrusions 46 by means of which the internal clip 30 is anchored in the body 2.

The internal clip 30 according to the first embodiment example comprises a rectangular cross section having a first side 48 and a second side 50 (cf. cross section along the line G-G per FIG. 5). A first side length of the first side 48 preferably lies in a range from 1 mm to 25 mm, further preferably in a range from 2 mm to 20 mm, particularly preferably in a range from 2 mm to 12 mm. A second side length of the second side 50 preferably lies in a range from 1 mm to 25 mm, further preferably in a range from 2 mm to 20 mm, particularly preferably in a range from 2 mm to 12 mm. According to the cross section along the line G-G, the first side 48 and the second side 50 have the same side length, and the cross section is therefore a square cross section.

The foam core 32 according to FIGS. 4 and 5 is formed of a polyethylene material. The foam core 32 thus has high shape stability, low density, and sufficient pliability. The foam core 32 is disposed in the second leg 6 and is entirely enclosed by the elastic material of the body 2. In the embodiment example according to FIGS. 4 and 5, the foam core 32 emulates the shape of the second leg 6 and is therefore also phallus-shaped in design. The foam core 32 comprises a radial foam core expansion 52 at an end proximal to the transition segment and a rounded foam core cap segments 54 at an end distal to the transition segment. The foam core 32 comprises a third, curved central axis $L_3$ running coaxial to the central axis $L_2$ of the second leg.

The foam core 32 reinforces the second leg 6 and is substantially perpendicular to the curved end face 28 of the second leg 6. The second end segment 36 of the internal clip 30 is disposed between the curved end face 28 and the foam core 32 and it is preferable that the foam core 32 and the second end segment 36 are not connected to each other.

Figure 6:
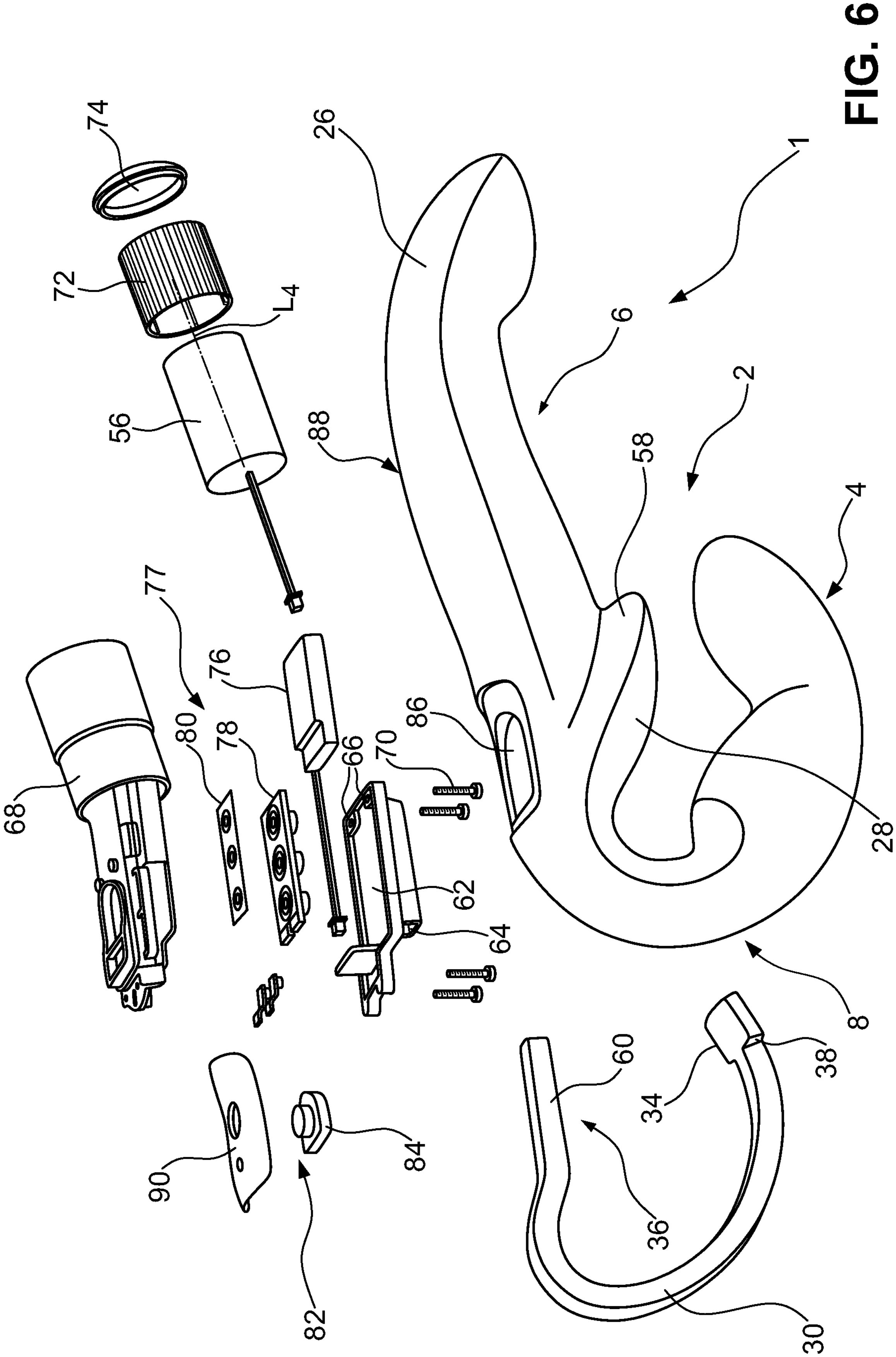
FIG. 6 is an exploded view according to a second embodiment example.

FIG. 6 shows an exploded view according to a second embodiment example of the partner toy 1, wherein the substantial difference is that no foam core 32, but rather a drive 56 for generating mechanical vibrations, is disposed in the second leg 6. The partner toy 1 according to the second embodiment example, like the partner toy 1 according to the first embodiment example, is formed of an elastic material, particularly a silicone material. The partner toy 1 according to the second embodiment example further comprises a body 2 having a curved shaped design. The body 2 further comprises a first leg 4, a second leg 6, and a transition segment 8 between the first and the second leg.

The first leg 4 is substantially identical to the first leg according to the first embodiment example, so that reference is made in full to the above description of the first leg 4. The second leg 6 also substantially matches the second leg of the first embodiment example. The curved end face 28, however, is more prominent in design in the second embodiment example in comparison with the first embodiment example. An offset 58 having a beveled surface is implemented at the end of the first leg 6 proximal to the transition 8. The offset 58 having the beveled surface forms a limit up to which the second leg can be inserted into a bodily orifice of the second person.

The internal clip 30, as in the first embodiment example, is formed of a thermoplastic polymer material having a low softening temperature range, particularly a polymorph, a thermoplastic polyester having a softening temperature range from 55° C. to 65° C., and comprises a first end segments 34 and a second end segment 36. The first end segment 34, like the internal clip 30 according to the first embodiment example, comprises a protrusion 38. The protrusion 38 extends, however, not only on one side of the internal clip 30, but rather on both sides of the internal clip 30, so that the first end segments 34 is more T-shaped in design. Said segments could, however, also extend on only one side, as in the first embodiment example, or could be completely different in design. The internal clip 30 is anchored in the body 2 by means of the T-shaped end segment 34.

A further difference is that a protrusion 60 is implemented at the second end segments 36 of the clip 30. The protrusion 60 forms a straight segment of the internal clip 30 and has a rectangular cross section here, for example. The protrusion 60 preferably has a length in a range from 10 mm to 40 mm. The protrusion 60 is connected to a first connecting segment 64 of a connecting element 62. The protrusion 60 can be connected to the first connecting segment 64 o the connecting element 62 in a form-fit, force-fit, and/or adhesive manner by means of any arbitrary joining method. For example the protrusion 60 is glued or screwed to the connecting segment 64. The internal clip 30 can further be implemented integrally with the connecting element 62 and/or the connecting segment 64. In the embodiment example shown, the first connecting segment 64 is implemented in the shape of a pocket having a rectangular cross section, and the protrusion 60 is at least partially inserted into the first connecting segment 64 in a form-fit manner. It is preferable that the protrusion 60 is fully inserted into the first connecting segment 64. The connecting element 62 is not absolutely necessary, and in other embodiments the connecting segment 63 an also be disposed or implemented directly on the drive support 68. It is also conceivable that the protrusion 60 is directly attached to the drive support 68.

The internal clip 30 is rigidly connected to the drive 56 by means of the connecting element 62. The drive 56 is therefore anchored in the body 2. The internal clip 30 can thus have two functions. The internal clip 30 is provided for aligning the first leg 4 and the second leg 6 to each other. The internal clip 30 can also be provided for anchoring the drive 56 in the body 2.

The connecting element 62 further comprises a second connecting segment 66 connected to a drive support 68. The second connecting segment 66 according to FIG. 6 is formed by holes, here four holes, so that the connecting element 62 is connected to the drive support 58 by means of screws 70 in a force-fit and form-fit manner.

The drive 56, particularly a vibration drive, and a damping sleeve 72 are disposed in the drive support 68. A closure cap 74 closes off the drive support 68. The drive 56 is connected to an energy source 76 for supplying the drive 56 with electrical energy, and to an electronic control unit 77 for actuating the drive 56. The energy source 76 is preferably a rechargeable battery and the electronic control unit 77 is a circuit board 78 including a protective film 80. The drive 56, energy source 76, and electronic control unit 77 are disposed in the second leg 6, so that the drive 56 generates mechanical vibrations in the second leg 6.

The drive 56 shown in FIG. 6 is cylindrical in design and comprises a fourth longitudinal axis $L_4$ extending coaxially to the second longitudinal axis $L_2$ of the second leg 6 when the drive 56 is disposed in the second leg 6. The mechanical vibrations generated are thus generated uniformly in the second leg 6 and the massage is perceived as particularly pleasant.

The electronic control unit 77 is coupled to a control element 82. In the embodiment example shown in FIG. 6, the control element 82 comprises a control knob 84 for switching the drive 56 on and off. The control element 82 is disposed in a recess 86 at the outer contour 88 of the body 2. The recess 86 is implemented opposite the curved end face 28 of the second leg 6, and further disposed such that the offset 58 having the beveled surface is disposed above the recess 86, wherein above means that the offset 58 having the beveled surface is disposed nearer to the cap segment 26 of the second leg 6. Because the offset 58 serves as a boundary up to which the second leg 6 can be inserted into a bodily orifice of the second person, the control element 82 therefore does not make contact with the body of the second person during penetration. The control element 82 also does not contact the body of the first person. The control element 82 according to FIG. 6 further comprises a cover 90 by means of which the control element 82 is attached to the body 2. The control element 82 including the cover 90 is disposed in the recess 86 such that said element forms a continuous outer contour 88 together with the body 2. Only the control knob 84 itself forms a haptic protrusion in the continuous outer contour 88 of the body 2.

FIG. 7 shows the partner toy 1, wherein the first leg 4 is vaginally inserted in a first person. The first leg is retained in the vagina 108 by the musculature of the pelvic floor 100. The first massage segments 20 is implemented for massaging the G-spot 102. The first massage segments 20 preferably presses on the G-spot 102. The second massage segments 22 contacts the inner wall 112 of the vagina 108 and massages the same. The second massage segment 22 preferably completely covers the entrance 110 of the vagina.

The end face 28 of the second leg 6 substantially contacts the clitoral region of the first person. The end face 28 extends from the ventral side of the entrance 110 of the vagina 108 across the outlet of the urethra 104 to the clitoris 106, wherein the end face 28 does not directly contact the clitoris 106 in the embodiment example shown. It is preferable that the end face 29 contacts the clitoris 106 for massaging the same. The second leg 6 is an emulation of a natural penis comprising a penis shaft and a penis head. The second central axis $L_2$ of the second leg 6 can be thought of as a continuation of the urethra 104, as for a natural penis. Unlike a strap-on, wherein the dildo is disposed at the height of the waist of the first person for penetrating a second person, the arrangement of the second leg 6 of the partner toy is significantly more natural. The partner toy 1, as a "strapless dildo," enables particularly realistic penetration of a second person.

A line Q and a line R are drawn in FIG. 7 for depicting the geometry of the second leg 6. Line Q lies in a plane perpendicular to the second central axis $L_2$ at point D, wherein the point D is an intersection between the second central axis $L_2$ and the end face 28. Line R lies in a plane perpendicular to the second central axis $L_2$ at point E, wherein point E is an intersection between the second central axis $L_2$ and an end of the second shaft 6 distal to the transition segment 8. Lines R and Q enclose an angle $\alpha$. The angle $\alpha$ preferably lies in a range from 20° to 90°, at about 70° in the embodiment example shown.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A partner toy for massaging a first person and a second person, comprising:
- a U-shaped body having a first leg for inserting into a bodily orifice of the first person, a second leg for inserting into a bodily orifice of the second person, and a transition segment between the first leg and the second leg, at least the second leg being cylindrical; and
- an internal clip in the U-shaped body configured to align the first leg and the second leg relative to each other, wherein the clip is made at least partially of a reversibly plastically deformable thermoplastic polymer material,
- wherein the first leg includes a back side and a ventral side, the back side being continuously curved, and the ventral side including a first convex curve segment distal to the transition segment and a second convex curve segment proximal to the transition segment,
- wherein the first convex curve segment and the second convex curve segment are separated from each other by a notch,
- wherein the second leg includes an end face proximal to the transition segment, the end face being convex and disposed opposite the second convex curve segment of the first leg in an initial shape of the U-shaped body,
- wherein the second leg is phallic-shaped in design and includes a radial expansion at an end proximal to the transition segment,
- wherein the internal clip includes a first end segment and a second end segment, and wherein the first end segment is disposed in the first leg and the second end segment is disposed in a region of the radial expansion of the second leg, and
- wherein the first end segment and the second end segment include a protrusion, and wherein the internal clip is anchored in the U-shaped body by the first end segment and the second end segment.

2. The partner toy according to claim 1, wherein the internal clip includes a rectangular cross section at least in a region of the transition segment, and wherein the cross section includes a first side length in a range from 2 mm to 12 mm and a second side length also in a range from 2 mm to 12 mm.

3. The partner toy according to claim 1, wherein the transition segment is molded integrally with the first leg and the second leg.

4. The partner toy according to claim 1, wherein the transition segment has a circular cross section.

5. The partner toy according to claim 4, wherein the transition segment has a diameter in a range from 15 mm to 30 mm.

6. The partner toy according to claim 1, wherein the first leg has a first length and the second leg has a second length, and wherein a length ratio between the first length of the first leg and the second length of the second leg is in a range from 1:2 to 1:4.

7. The partner toy according to claim 1, wherein the material of the internal clip is a thermoplastic polyester material.

8. The partner toy according to claim 1, wherein the material of the internal clip has a softening temperature range in a range from 50° C. to 80° C.

9. The partner toy according to claim 1, wherein the internal clip is a polymorphic material.

10. The partner toy according to claim 1, further comprising:

a foam core disposed in the second leg, wherein the foam core is fully enclosed by elastic material of the U-shaped body.

11. The partner toy according to claim 10, wherein the foam core is at least partially a polyethylene material.

12. The partner toy according to claim 11, wherein the foam core emulates a shape of the second leg.

13. A partner toy, comprising:

a U-shaped body having a first leg for inserting into a bodily orifice of the first person, a second leg for inserting into a bodily orifice of the second person, and a transition segment between the first leg and the second leg, at least the second leg being cylindrical;

an internal clip in the U-shaped body configured to align the first leg and the second leg relative to each other, wherein the clip is made at least partially of a reversibly plastically deformable thermoplastic polymer material;

a drive;

a drive support for receiving the drive;

an energy source for supplying the drive with electrical energy; and an electronic control unit for actuating the drive, wherein the drive generates mechanical vibrations in the second leg of the U-shaped body, wherein the first leg includes a back side and a ventral side, the back side being continuously curved, and the ventral side including a first convex curve segment distal to the transition segment and a second convex curve segment proximal to the transition segment, wherein the first convex curve segment and the second convex curve segment are separated from each other by a notch, wherein the second leg includes an end face proximal to the transition segment, the end face being convex and disposed opposite the second convex curve segment of the first leg in an initial shape of the U-shaped body, and wherein the drive is rigidly connected to the internal clip.

14. The partner toy according to claim 13, wherein the electronic control unit includes a memory having a plurality of pre-stored vibration profiles.

15. The partner toy according to claim 14, further comprising:

at least one control element coupled to the electronic control unit and configured to switch on and off the drive or configured to select a vibration profile from the plurality of pre-stored vibration profiles.

16. The partner toy according to claim 15, wherein the at least one control element is disposed in a recess on an outer side of the U-shaped body.

17. The partner toy according to claim 13, wherein the drive includes a longitudinal axis, and wherein the longitudinal axis of the drive is disposed parallel to a longitudinal axis of the second leg.

* * * * *